United States Patent [19]

DuBois et al.

[11] Patent Number: 5,048,996

[45] Date of Patent: Sep. 17, 1991

[54] UNIVERSAL CONNECTOR FOR RETAINING AND LINKING MEMBERS

[75] Inventors: Chester G. DuBois, Zion; Kurt R. Dembski, Lake Villa, both of Ill.

[73] Assignee: Outboard Marine Corporation, Waukegan, Ill.

[21] Appl. No.: 547,612

[22] Filed: Jul. 2, 1990

[51] Int. Cl.$^5$ .............................................. B25G 3/00
[52] U.S. Cl. .................................. 403/287; 403/155; 403/326; 411/352
[58] Field of Search ............... 403/155, 326, 163, 287; 411/352, 353, 522, 523, 524, 530; 74/595

[56]  References Cited

U.S. PATENT DOCUMENTS

| | | |
|---|---|---|
| 203,308 | 5/1878 | Wood . |
| 1,397,101 | 11/1921 | Kelly ............................... 411/530 X |
| 1,882,625 | 10/1932 | Jacobi ............................. 403/326 X |
| 3,187,521 | 6/1965 | Morris et al. . |
| 3,471,186 | 10/1969 | Luebbert et al. .............. 403/326 X |
| 4,218,979 | 8/1980 | Esposito et al. . |
| 4,428,544 | 1/1984 | Councilman . |
| 4,505,058 | 3/1985 | Peterson . |
| 4,715,738 | 12/1987 | Stocker . |
| 4,875,388 | 10/1989 | Bouvot ............................ 74/595 X |

Primary Examiner—Andrew V. Kundrat
Attorney, Agent, or Firm—Welsh & Katz, Ltd.

[57] ABSTRACT

A universal connector for linking and retaining first and second members to one another, wherein the first member has a tapered end portion for insertion into the connector, the first member having a reduced cross sectional portion forming an annular groove adjacent but spaced from the tapered end portion, wherein the connector has a main body with one end portion having an aperture for receiving the second member in retaining engagement, an opposite end portion having an aperture for receiving the first member in retaining engagement, and a bridging portion interconnecting the one end portion and the opposite end portions together. The connector includes a removable resilient retainer carried by the opposite end portion which permits the first member to be inserted in the aperture of the opposite end portion with the retainer fitting within the annular groove for retaining the first member, the retainer means being substantially the same shape and size before the first member is inserted as after the same is inserted.

15 Claims, 1 Drawing Sheet

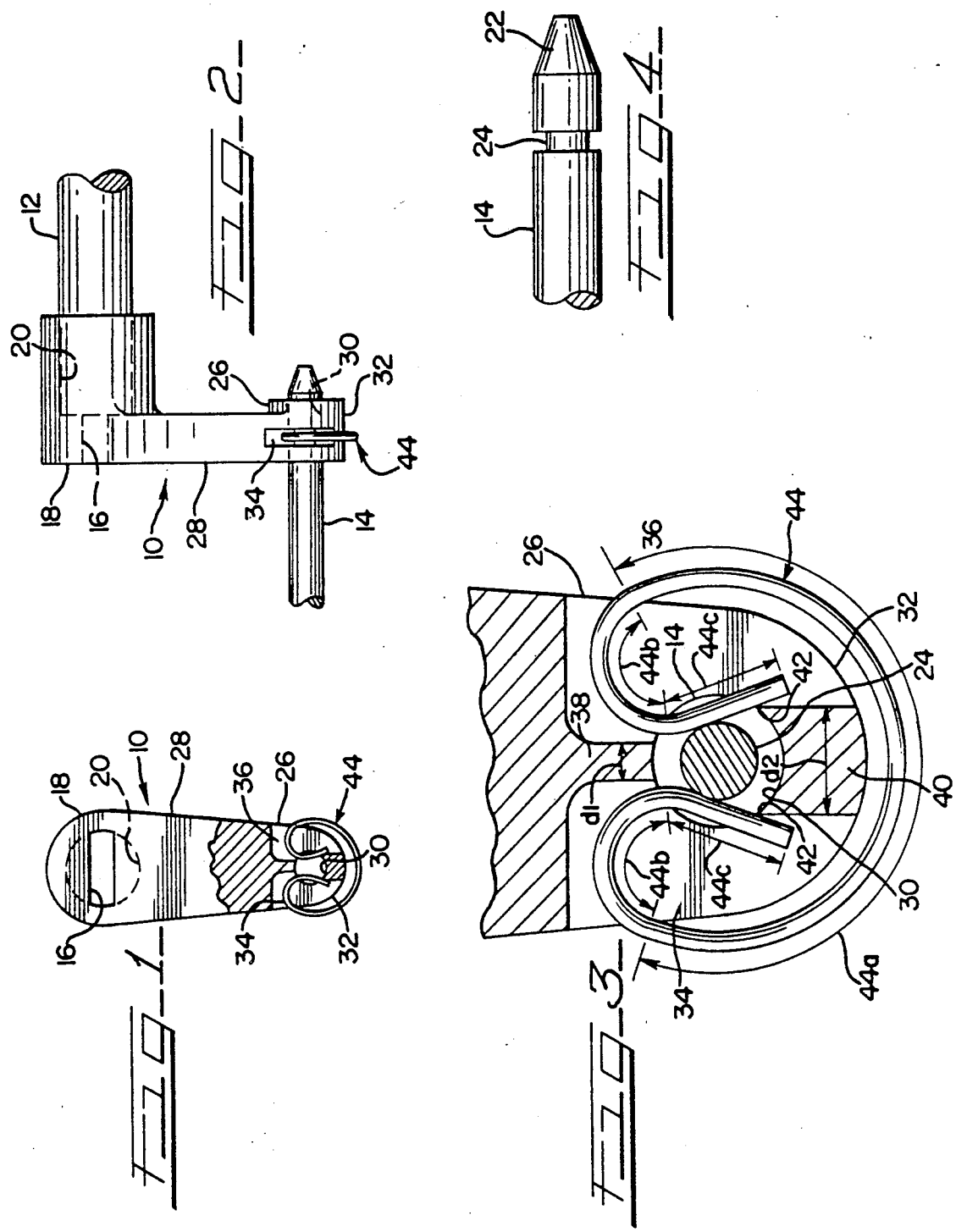

UNIVERSAL CONNECTOR FOR RETAINING AND LINKING MEMBERS

The present invention generally relates to connectors for linking and/or retaining two members to one another, and more particularly to linking and/or retaining elongated members such as levers and/or rods together.

There are many mechanical products manufactured which include rods, levers and the like, which must be connected together to obtain a finished product. While they are known as linkages, retainers, and the like, they are basically connecting devices, many of which have universal application. Because many applications for such connectors have specialized requirements in the context of the end product for which they are used, there have obviously been a multitude of designs over the decades. Nevertheless, improvements in such connectors continues, and the universal connector of the present invention is no exception.

While the connector of the present invention is intended to replace a similar connector that has the same overall shape, size and function, the prior connector required cotter pins to retain the rod that was being connected to it, and insertion of the cotter pins was time consuming and difficult, because of the limited space available for an assembler to insert the pins.

Accordingly, it is a general object of the present invention to provide an improved universal connector for linking and/or retaining two members, such as levers and/or rods, which offers the advantage of easy and foolproof installation without any significant probability of unwanted separation thereafter.

Another object of the present invention is to provide such an improved universal connector which has all necessary components present when either of the members for which it is intended to link are present, and the other member can be easily inserted at a subsequent time and be secured without any additional parts or steps.

Yet another object of the present invention lies in the provision that while the members are linked together permanently if desired, either member can be removed relatively easily with a simple tool.

Still another object of the present invention lies in the provision that the improved connector can be installed to one of the members and installed in the product or in a location that is difficult to reach, and the other member can be installed by simply inserting the other member in it, and it will be firmly retained thereafter.

It is a further object of the present invention to provide such an improved connector that can be economically manufactured and quickly and easily installed with minimal labor costs.

These and other objects will become apparent upon reading the following detailed description of the present invention, while referring to the attached drawings, in which:

FIG. 1 is an end view of the preferred embodiment of the connector of the present invention, shown with portions removed to reveal structural features of the connector;

FIG. 2 is a side view of the preferred embodiment of the present invention, shown with an upper lever arm and lower rod installed;

FIG. 3 is an enlarged view of a portion of the connector and particularly illustrating a cross section of the lower portion of the connector shown in FIG. 1; and, FIG. 4 is a side view of an end portion of a rod that is adapted for use in connection with the connector of the present invention.

DETAILED DESCRIPTION

Broadly stated, the present invention shown in the drawings comprises a universal connector that can be used to easily and effectively link and retain two separate members, such as a lever arm and a rod, such that the two will not separate without a person purposefully doing so, even in an environment that has significant vibration and movement. While the connector has many uses, and may be used with different shaped levers, arms, rods and the like, the preferred embodiment illustrated is for use in linking and retaining a lever and a rod, with the application being particularly adapted for rotating the connector and rod generally around the axis of the lever. The lever is shown in the drawings to be generally cylindrical in shape, but has a generally rectangular cross section at its outer end for insertion into the connector. The rectangular cross section precludes the possibility that the connector will slip relative to the lever, which would be unsatisfactory in many applications, including the application of shifting an outboard motor between forward and reverse running conditions.

Turning now to the drawings, and particularly FIG. 2, the connector, indicated generally at 10, is shown installed so that it links a lever 12 and a rod 14. The lever 12 is of generally cylindrical construction, but has at least one end portion that is generally rectangular so that it can fit in a similar rectangular aperture 16 in an upper end portion 18 of the connector (see FIG. 1). The upper end portion 18 has a generally circular aperture portion 20 that extends from the right end as shown in FIG. 2 toward the left end where it changes to the rectangular aperture 16. With such construction, the lever 12 will positively rotate the connector 10 without any slippage when it is rotated.

The connector 10 is adapted for attachment with the rod 14, the end of which is attached to the connector 10 being shown in FIG. 4. As illustrated, it has a tapered end portion 22, shown to be a truncated conical end, and it has a reduced diameter portion 24 which defines an annular groove that is spaced from the end portion 22 by an amount that is determined by the dimensions of the connector itself and by the amount that the end portion 22 is desired to protrude from the connector when the rod 14 is installed, as shown in FIG. 2. In this regard, and referring to FIG. 2, the connector 10 has a lower end portion 26 that is integrally formed as a part of the connector 10 and is connected to the upper end portion 18 by a bridge portion 28. The lower end portion has an aperture 30, which is preferred circular and of a size so that the rod 14 snugly fits within it. As best shown in FIG. 3, a lower end 32 of the lower end portion 26 is semicircular in shape.

In accordance with an important aspect of the present invention, the lower end portion 26 has a pair of slots 34 and 36 located in the same general plane and on opposite sides thereof as shown in FIGS. 1-3. The slots are formed so that there is a remaining part of material 38 having a thickness d1 between the top of the slots 34, 36 and the aperture 30, and a remaining part of material 40 between the innermost surfaces of the slots from the aperture 30 and the lower end 32 that has a thickness d2. The thickness of the part 40 is larger than the thickness of the part 38, as is evident from FIG. 3. As will be described, the upper sides of the part of material 40, identified at 42, are contact surfaces for a retainer, indicated generally at 44, which holds the rod 14 in place when it has been inserted into the connector 10.

Referring to FIG. 3, the retainer 44 is of unitary construction, and is preferably fabricated from a resilient metal wire, but may also be made from stamping if desired, and may also be a nonmetallic material, provided it has sufficient strength and resiliency. While the retainer 44 is of unitary construction, it can be described as having distinct segments which merge with one another. The retainer 44 has a main semicircular segment 44a which has a diameter slightly larger than the diameter of the lower end 32 of the lower end portion of the connector body 10, smaller semicircular segments 44b, each of which merge with one end of the segment 44a and also with a generally straight segment 44c. The two straight segments 44c are oriented to form an acute angle relative to one another.

In accordance with an important aspect of the present invention, the shape of the retainer is such that the diameter of the reduced diameter portion 24 of the rod 14 is larger than the thickness d1 and less than the thickness d2, and the angle between the straight segments 44c is such that the segments 44c contact the surfaces 42 and the reduced diameter portion 24 when the rod 14 is inserted and retained by the retainer 44, as shown in FIG. 3. With such relationships, the straight segments 44c contact the reduced diameter portion 24 at tangent points that are above the center of the rod 14, and are therefore in an "overcenter" relation. Also, with such relationships, two advantages are obtained. First, the shape and size of the retainer is generally the same regardless of whether the rod 14 is inserted in the connector 10 or not. Second, the insertion of the rod into the aperture 30 of the connector will not tend to cause the retainer to be dislodged from its position by the deflection caused by the rod 14 upon insertion. The thickness d1 of the part 38 is less than the spacing between the closest points of the segments 44b of the retainer, which enables the retainer to firmly contact the reduced diameter 24 of the rod 14 which is desireable.

The diameter of the segment 44a of the retainer 44 is slightly larger than the diameter of the lower end 32, so that the retainer 44 can be easily removed from the connector body 10 if desired by using a simple tool such as a screwdriver or the like to pry the retainer from the slots 34, 36. By having the larger diameter segment 44a, overstressing of the retainer is minimized during insertion of the rod 14 into the aperture 30, which reduces the potential of breakage of the retainer.

From the foregoing, it should be understood that an improved universal connector has been shown and described which has many significant attributes and advantages. One distinct advantage of the present invention is that the retainer 44 can be installed before either the lever 12 or the rod 14 are inserted into the connector body 10, and the retainer will be firmly retained in the slots 34, 36. The geometry of the retainer 44 and lower portion 26 of the connector body 10 is such than insertion of the rod 14 will not dislodge the retainer, and the rod 14 will be firmly held in place once it is inserted. While the rod 14 will be held in place, it can be relatively easily removed, if desired, simply by prying the retainer 44 with a screwdriver or similar tool.

While various embodiments of the present invention have been shown and described, it should be understood that various alternatives, substitutions and equivalents can be used, and the present invention should only be limited by the claims and equivalents thereof.

Various features of the present invention are set forth in the following claims.

What is claimed is:

1. A universal connector for linking and retaining first and second members to one another, wherein the first member has a tapered end portion for insertion into the connector, the first member having a reduced cross sectional portion forming a retaining groove therein adjacent but spaced from said tapered end portion, said connector comprising:

a main connector body with one end portion having an aperture for receiving the second member in retaining engagement, an opposite end portion having an aperture for receiving the first member in retaining engagement, and a bridging portion interconnecting said one end portion and said opposite end portions together;

a removable resilient retainer means carried by said opposite end portion and being sufficiently flexible to permit the first member to be inserted in said aperture of said opposite end portion, said retainer means fitting within the retaining groove for retaining the first member, said retainer means being substantially the same shape and size before the first member is inserted as after the same is inserted;

said retainer means comprising a unitary curved member with a generally semicircular segment of a first diameter, with the opposite ends of the semicircular segment merging with curved segments of substantially reduced effective diameter, the outer ends of each of the curved segments merging with generally straight segments that are directed toward said semicircular segment and away from one another at a predetermined acute angle, the points of merger of the curved segments and the straight segments being spaced from one another by a distance slightly less than the diameter of the retaining groove;

said opposite end portion having a pair of slots located in the same generally plane on the outer surface thereof, said slots being adapted to receive said retainer means therein, the outer surfaces of said opposite end portion between said slots and between the aperture and the end surface of said opposite end portion providing contact surfaces for said straight segments of said retaining means.

2. A connector as defined in claim 1 wherein said aperture in said opposite end portion is circular.

3. A connector as defined in claim 2 wherein said retainer means is deflected from its normal unbiased shape and size when carried by said opposite end portion, said retainer means being retained so as to not be easily moveable when carried by said opposite end portion regardless of whether the first member is inserted in the aperture of the first member.

4. A connector as defined in claim 3 wherein said retainer means is in contact with the reduced diameter surface and with said opposite end portion when the first member is inserted in said aperture of said opposite end portion.

5. A connector as defined in claim 1 wherein said opposite end portion has an outer end that is generally semicircular shaped with the center thereof being generally the same as the center of said aperture, said generally semicircular segment of said unitary curved member being slightly larger than the outer diameter of said semicircular shaped outer end, thereby permitting easy removal of said retainer means by insertion of a tool between the retainer means and the center end and prying said retainer means therefrom.

6. A connector as defined in claim 1 wherein said predetermined acute angle is defined by lines extending from said contact surfaces to the tangent of the surface of said retaining groove with respect to each slot in said opposite end portion.

7. A connector as defined in claim 1 wherein the outer surfaces of said opposite end portion between said slots and between the aperture and the upper end surface of said slots being dimensioned to have a distance therebetween such that said curved segments of substantially reduced effective diameter of said retaining means are out of contact with said surfaces.

8. A connector as defined in claim 1 wherein said aperture of said one end portion is noncircular and an end portion of said second member is of a slightly smaller but complementary shape capable of being inserted in said aperture of said one end portion, so that rotation of said second member positively rotates said connector.

9. A connector as defined in claim 1 wherein said retainer means comprises metallic material.

10. A connector as defined in claim 1 wherein said retainer means comprises a nonmetallic material.

11. A connector as defined in claim 1 wherein the first member is of generally cylindrical cross section.

12. A universal connector for linking and retaining first and second members to one another, wherein the first member is of generally cylindrical cross section and has a tapered end portion for insertion into the connector, the first member having a reduced diameter portion forming an annular groove therein adjacent but spaced from said tapered end portion, said connector comprising:
   a main connector body with one end portion having an aperture for receiving the second member in retaining engagement, an opposite end portion having an aperture for receiving the first member in retaining engagement, and a bridging portion interconnecting said one end portion and said opposite end portions together; and,
   a removable resilient retainer means carried by said opposite end portion and being sufficiently flexible to permit the first member to be inserted in said aperture of said opposite end portion, said retainer means fitting within the annular groove for retaining the first member, said retainer means being substantially the same shape and size before the first member is inserted as after the same is inserted;
   said retainer means comprising a unitary curved member with a generally semicircular segment of a first diameter, with the opposite ends of the semicircular segment merging with curved segments of substantially reduced effective diameter, the outer ends of each of the curved segments merging with generally straight segments that are directed toward said semicircular segment and away from one another at a predetermined acute angle, the points of merger of the curved segments and the straight segments being spaced from one another by a distance slightly less than the diameter of the retaining groove;
   said opposite end portion having a pair of slots located in the same general plane on opposite sides of said opposite end portion, said slots being adapted to receive said retainer means therein, the outer surfaces of said opposite end portion between said slots and between the aperture and the end surface of said opposite end portion providing contact surfaces for said straight segments of said retaining means.

13. A connector as defined in claim 12 wherein said opposite end portion has an outer end that is generally semicircular shaped with the center thereof being generally the same as the center of said aperture, said generally semicircular segment of said unitary curved member being slightly larger than the outer diameter of said semicircular shaped outer end, thereby permitting easy removal of said retainer means by insertion of a tool between the retainer means and the outer end and prying said retainer means therefrom.

14. A connector as defined in claim 12 wherein said predetermined acute angle is defined by lines extending from said contact surfaces to the tangent of the surface of said annular groove with respect to each slot in said opposite end portion.

15. A connector as defined in claim 12 wherein the outer surfaces of said opposite end portion between said slots and between the aperture and the upper end surface of said slots being dimensioned to have a distance therebetween such that said curved segments of substantially reduced effective diameter of said retaining means are out of contact with said surfaces.

* * * * *

UNITED STATES PATENT AND TRADEMARK OFFICE
CERTIFICATE OF CORRECTION

PATENT NO. : 5,048,996

DATED : September 17, 1991

INVENTOR(S) : DuBois et al.

It is certified that error appears in the above-identified patent and that said Letters Patent is hereby corrected as shown below:

Column 4, line 43, change "generally" to --general--.

Column 5, line 4, change "center" to --outer--.

Signed and Sealed this

Sixteenth Day of March, 1993

Attest:

STEPHEN G. KUNIN

*Attesting Officer*  Acting Commissioner of Patents and Trademarks